United States Patent
Krichevsky et al.

(10) Patent No.: US 8,619,508 B1
(45) Date of Patent: Dec. 31, 2013

(54) DISK DRIVE ADJUSTING FLY HEIGHT ACTUATOR TO COMPENSATE FOR LASER INDUCED HEAD PROTRUSION IN HEAT ASSISTED MAGNETIC RECORDING

(75) Inventors: Alexander Krichevsky, San Jose, CA (US); Davide Guarisco, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/556,132

(22) Filed: Jul. 23, 2012

(51) Int. Cl.
G11B 11/00 (2006.01)

(52) U.S. Cl.
USPC ....................................... 369/13.11

(58) Field of Classification Search
USPC ................................ 369/13.01, 13.02, 13.11
See application file for complete search history.

(56) References Cited

U.S. PATENT DOCUMENTS

| | | | |
|---|---|---|---|
| 5,392,273 A | 2/1995 | Masaki et al. | |
| 5,805,559 A | 9/1998 | Murakami et al. | |
| 6,046,970 A | 4/2000 | DeCusatis et al. | |
| 6,359,433 B1 | 3/2002 | Gillis et al. | |
| 6,417,981 B1 | 7/2002 | Smith | |
| 6,636,460 B2 | 10/2003 | Akiyama et al. | |
| 6,700,724 B2 | 3/2004 | Riddering et al. | |
| 6,771,440 B2 | 8/2004 | Smith | |
| 6,801,376 B2 | 10/2004 | Smith | |
| 6,804,189 B2 | 10/2004 | Inase et al. | |
| 6,883,368 B2 | 4/2005 | Smith et al. | |
| 6,894,854 B1 | 5/2005 | Carlson et al. | |
| 6,950,260 B2 | 9/2005 | Coffey et al. | |
| 6,975,472 B2 | 12/2005 | Stover et al. | |
| 7,023,647 B2 | 4/2006 | Bloodworth et al. | |
| 7,068,449 B2 | 6/2006 | Riddering et al. | |
| 7,095,577 B1 | 8/2006 | Codilian et al. | |
| 7,099,097 B2 * | 8/2006 | Hamaguchi et al. | ............ 360/59 |
| 7,161,882 B2 | 1/2007 | Lehr et al. | |
| 7,177,253 B2 | 2/2007 | Ishibashi et al. | |
| 7,180,692 B1 | 2/2007 | Che et al. | |
| 7,324,299 B1 | 1/2008 | Schreck et al. | |
| 7,369,340 B1 | 5/2008 | Dang et al. | |
| 7,400,473 B1 | 7/2008 | Krajnovich et al. | |
| 7,412,143 B2 | 8/2008 | Rottmayer et al. | |
| 7,436,620 B1 | 10/2008 | Kang et al. | |
| 7,440,219 B2 | 10/2008 | Zhu et al. | |
| 7,489,466 B2 | 2/2009 | Knigge et al. | |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

Primary Examiner — Brenda Bernardi

(57) ABSTRACT

A disk drive is disclosed comprising a head actuated over a disk, wherein the head comprises a laser operable to heat the disk while writing data to the disk, and a fly height actuator (FHA) operable to adjust a fly height of the head over the disk. When a write command is received to write data to a target data track, the head is positioned over the target data track. When the head approaches a target data sector of the target data track, a power applied to the FHA is increased to decrease the fly height of the head. When the head reaches the target data sector, a power applied to the laser is increased to heat the disk, and the power applied to the FHA is decreased substantially monotonically while writing data to the target data sector.

14 Claims, 3 Drawing Sheets

(56) References Cited

U.S. PATENT DOCUMENTS

| | | | |
|---|---|---|---|
| 7,502,205 B1 | 3/2009 | Hurtado et al. | |
| 7,508,617 B1 | 3/2009 | Mak et al. | |
| 7,675,707 B1 | 3/2010 | Liu et al. | |
| 7,724,470 B2 | 5/2010 | Poon et al. | |
| 7,791,986 B2 | 9/2010 | Koyama et al. | |
| 7,839,595 B1 | 11/2010 | Chue et al. | |
| 7,876,655 B2 | 1/2011 | Sasaki | |
| 7,898,759 B2 | 3/2011 | Matsumoto et al. | |
| 7,916,420 B1 | 3/2011 | McFadyen et al. | |
| 7,990,647 B2 * | 8/2011 | Lille | 360/59 |
| 7,995,425 B2 | 8/2011 | Schreck et al. | |
| 8,059,357 B1 | 11/2011 | Knigge et al. | |
| 8,248,732 B2 * | 8/2012 | Nishiyama et al. | 360/245.9 |
| 8,248,896 B1 * | 8/2012 | Yuan et al. | 369/13.33 |
| 8,300,338 B1 | 10/2012 | McFadyen | |
| 8,320,069 B1 | 11/2012 | Knigge et al. | |
| 8,441,909 B1 | 5/2013 | Thayamballi et al. | |
| 8,456,980 B1 | 6/2013 | Thayamballi | |
| 2002/0136115 A1 | 9/2002 | Kadlec et al. | |
| 2006/0233061 A1 | 10/2006 | Rausch et al. | |
| 2007/0014041 A1 | 1/2007 | Lille et al. | |
| 2007/0230012 A1 | 10/2007 | Erden et al. | |
| 2007/0291401 A1 * | 12/2007 | Sun et al. | 360/75 |
| 2008/0158730 A1 | 7/2008 | Furukawa et al. | |
| 2009/0207519 A1 | 8/2009 | Erden et al. | |
| 2009/0225464 A1 | 9/2009 | Juang et al. | |
| 2009/0251828 A1 | 10/2009 | Schreck et al. | |
| 2009/0303629 A1 | 12/2009 | Nakano et al. | |
| 2010/0123967 A1 | 5/2010 | Batra et al. | |
| 2010/0232050 A1 * | 9/2010 | Schreck et al. | 360/59 |
| 2011/0090602 A1 * | 4/2011 | Nishiyama et al. | 360/246.4 |
| 2011/0205861 A1 | 8/2011 | Erden et al. | |
| 2011/0292773 A1 * | 12/2011 | Schreck et al. | 369/13.33 |
| 2012/0188859 A1 * | 7/2012 | Hara et al. | 369/13.33 |

OTHER PUBLICATIONS

Patrick Gale, "Estimating Laser Diode Lifetimes and Activation Energy", ILX Lightwave Application Note 33, 2008, http://www.ilxlightwave.com/appnotes/AN%2033%20REV01%20Estimating-%20Laser%20Diode%20Lifetimes%20&%20Activation%20Energy.pdf.

* cited by examiner

DISK DRIVE ADJUSTING FLY HEIGHT ACTUATOR TO COMPENSATE FOR LASER INDUCED HEAD PROTRUSION IN HEAT ASSISTED MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

DETAILED DESCRIPTION

Figures 1A, 1B, 1C:
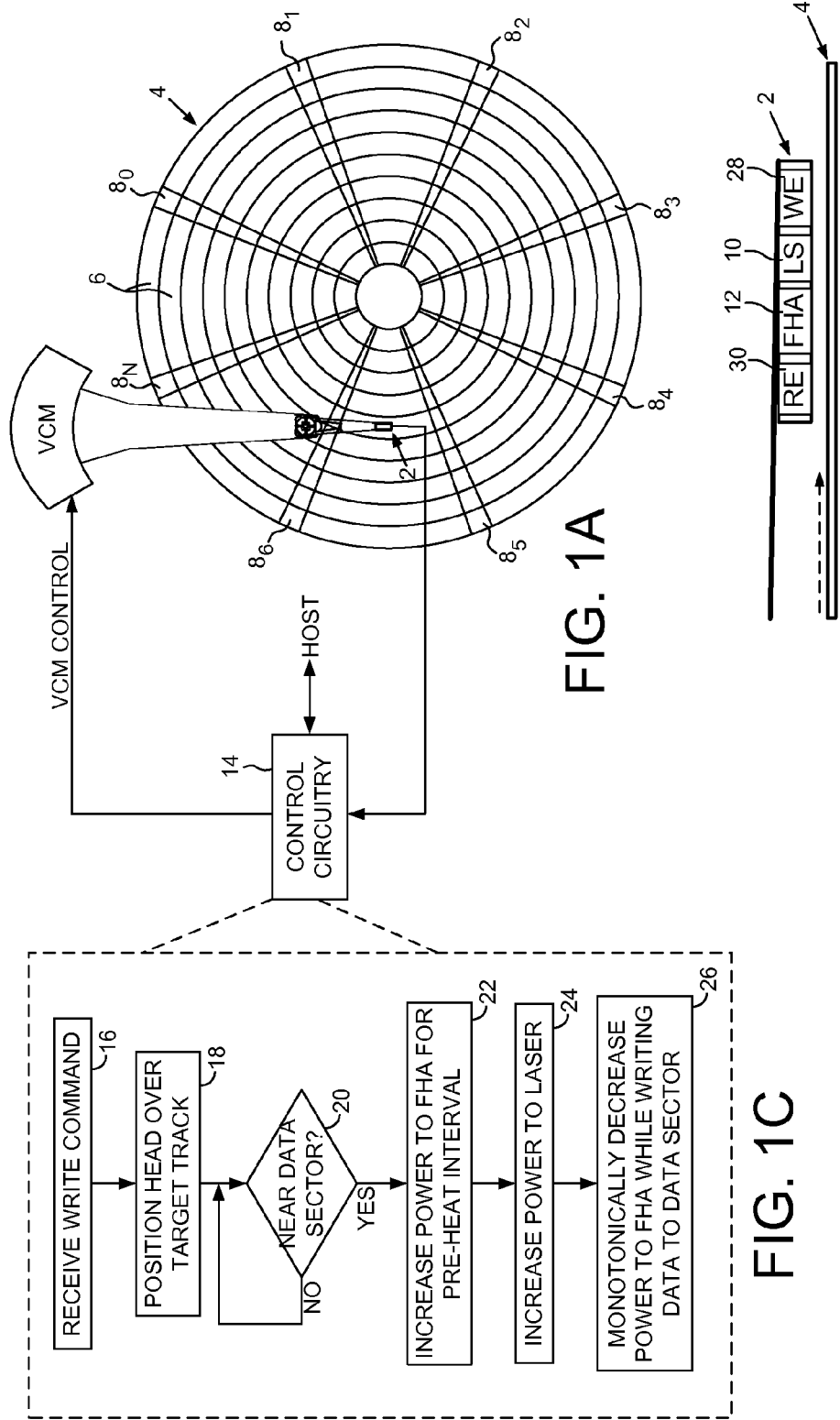
FIG. 1A shows a disk drive according to an embodiment of the present invention comprising a head actuated over a disk.
FIG. 1B shows an embodiment of the present invention wherein the head comprises a write element, a read element, a laser, and a fly height actuator (FHA).
FIG. 1C is a flow diagram according to an embodiment of the present invention wherein during a write operation the laser is used to heat the surface of the disk while decreasing substantially monotonically a power applied to the FHA to account for the heating effect of the laser over time.

FIG. 1A shows a disk drive according to an embodiment of the present invention comprising a head 2 actuated over a disk 4 comprising a plurality of data tracks 6 defined by servo sectors $8_0$-$8_N$, where each data track comprises a plurality of data sectors. The head comprises a laser 10 (FIG. 1B) operable to heat the disk 4 while writing data to the disk 4 and a fly height actuator (FHA) 12 operable to adjust a fly height of the head 2 over the disk 4. The disk drive further comprises control circuitry 14 operable to execute the flow diagram of FIG. 1C, wherein when a write command is received to write data to a target data track (block 16), the head is positioned over the target data track (block 18), and when the head approaches a target data sector of the target data track (block 20), a power applied to the FHA is increased to decrease the fly height of the head (block 22). When the head reaches the target data sector, a power applied to the laser is increased to heat the disk (block 24), and the power applied to the FHA is decreased substantially monotonically while writing data to the target data sector (block 26).

Any suitable FHA 12 may be employed in the embodiments of the present invention, such as a heater which controls the fly height through thermal expansion, or a piezoelectric (PZT) actuator which may deflect toward the disk when energized (e.g., with a driving voltage). The FHA 12 is controlled to maintain the head at a target fly height during write and read operations. When not performing write/read operations, the FHA 12 may be controlled to increase the fly height of the head so as to avoid collisions with asperities on the disk.

Any suitable laser 10 may be employed in the embodiments of the present invention, such as a laser diode. In addition, embodiments of the present invention may employ any suitable techniques for focusing the laser 10 on the disk 4, such as a suitable waveguide, focusing lens, or other suitable elements. Also in the embodiment of FIG. 1B, the head 2 comprises a write element 28 (e.g., an inductive coil) and a read element 30 (e.g., a magnetoresistive read element). During write operations the power applied to the laser 10 is increased in order to heat the disk 4, thereby decreasing the coercivity so that the data is written more reliably. The write power of the laser 10 may be calibrated periodically to ensure optimal heating over the life of the disk drive, and because the laser's output may degrade over time.

In one embodiment, the light emitted by the laser 10 is passed through a suitable waveguide and then through a suitable near field transducer in order to focus the light onto a very small spot on the surface of the disk 4. When the laser power is increased at the beginning of a write operation, the near field transducer radiates heat to the head near the write element 28, thereby causing the write element 28 to protrude toward the surface of the disk 4 due to thermal expansion. The time constant of this protrusion is typically very short such that in one embodiment the write operation may begin very soon after increasing the laser power. In one embodiment after increasing the laser power, the FHA power is decreased in order to account for the protrusion caused by the heating effect of the near field transducer as well as the heating effect of the write current. As the write operation progresses over time, there is a secondary heating effect due to the laser and a continued heating of the near field transducer propagating through the head which causes a corresponding increase in the head protrusion having a longer time constant than the primary heating effect. Accordingly, in one embodiment the FHA power is decreased substantially monotonically during the write operation to account for the secondary heating effect of the laser over time.

Figure 2A:
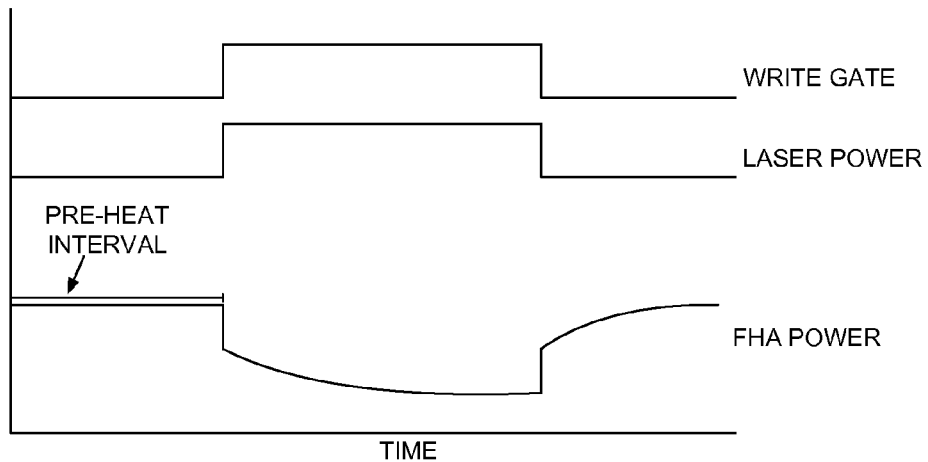
FIG. 2A shows an embodiment of the present invention wherein the FHA power is decreased based on a function comprising at least one exponential.

FIG. 2A illustrates an embodiment of the present invention wherein when processing a write command the FHA power is increased during a pre-heat interval when the head approaches the first target data sector in order to decrease the fly height of the head toward a target fly height. When the head reaches the first target data sector, the laser power is increased (using a step function in this example), with a corresponding step function decrease in the FHA power to account for the protrusion of the head due to the heating effect of the near field transducer as well as the write current. The FHA power is then decreased substantially monotonically while writing data to the disk to account for the secondary heating effect of the laser over time. The FHA power may be decreased substantially monotonically based on any suitable function, wherein in one embodiment the function comprises at least one exponential.

FIG. 2A also illustrates an embodiment of the present invention wherein the laser power is decreased (using a step function in this example) after writing the data to the target data track with a corresponding step function increase in the FHA power to account for the cooling effect of the near field transducer. The FHA power is then increased substantially monotonically over time to account for the secondary cooling effect of the laser over time. In one embodiment, the FHA power is increased at the end of a write operation substantially monotonically based on a function comprising at least one exponential.

Figure 2B:
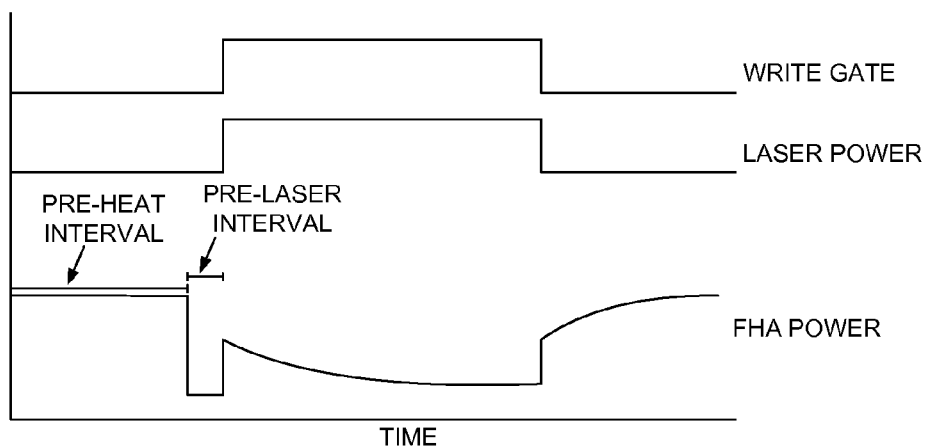
FIG. 2B shows an embodiment of the present invention wherein the FHA power is decreased by a step function over a pre-laser interval, and then decreased exponentially after increasing the laser power.
Figure 2C:
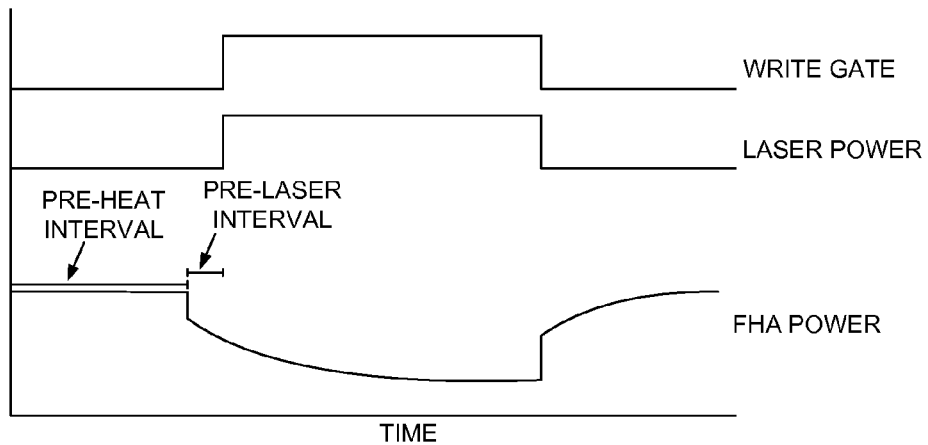
FIG. 2C shows an embodiment of the present invention wherein the FHA power is decreased exponentially starting from the beginning of the pre-laser interval.

FIG. 2B shows an embodiment of the present invention wherein at the end of the pre-heat interval, the FHA power is decreased by a step function over a pre-laser interval to generate a corresponding increase in the fly height. When the laser power is increased at the beginning of the write operation, the increased fly height compensates for the protrusion transient of the near field transducer when the laser power is increased. The FHA power is then increased by a step function and then decreased substantially monotonically while writing the data to the disk. FIG. 2C shows an alternative embodiment wherein the FHA power is reduced by a step function at the beginning of the pre-laser interval, and then decreased substantially monotonically during the pre-laser interval as well as after increasing the laser power. The embodiment of FIG. 2C may sufficiently compensate for the protrusion transient that occurs at the beginning of the write operation while reducing the complexity of the control circuitry. Other suitable functions may be employed to adjust the laser power during the pre-heat and/or pre-laser intervals prior to decreasing the FHA power substantially monotonically while writing the data to the disk.

The FHA power may be reduced substantially monotonically during a write operation using any suitable function. In one embodiment, the function is selected to substantially match the transient response of the FHA to the laser's heating effect on the protrusion transient of the head. Since the transient response of the laser's heating effect typically comprises one or more exponentials, the function for decreasing the FHA power during the write operation may comprise one or more corresponding exponentials. In one embodiment, the FHA power may be decreased substantially monotonically over a first part of the write operation, and then held at a steady state value during the remainder of the write operation (depending on the length of the write operation).

Figure 3A:
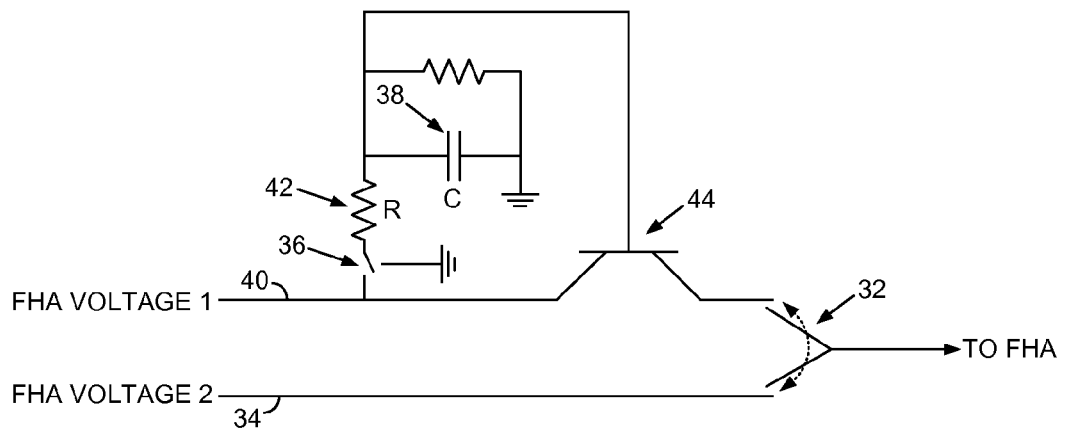
FIG. 3A shows control circuitry according to an embodiment of the present invention for decreasing/increasing the FHA power based on a single exponential.

Any suitable control circuitry may be employed in the embodiments of the present invention to implement the function for decreasing/increasing the FHA power substantially monotonically during/after a write operation. FIG. 3A shows control circuitry according to an embodiment of the present invention for increasing/decreasing the FHA power based on a function comprising a single exponential. During the pre-heat interval (FIG. 2A) a switch 32 applies a second voltage 34 to the FHA and a switch 36 connects a capacitor 38 to a first voltage 40 through a resistor 42, where the first voltage 40 charges the capacitor 38 to a predetermined voltage that turns on transistor 44. After the pre-heat interval, the power to the laser is increased, the switch 32 connects the first voltage 40 to the FHA (through transistor 44), and switch 36 is connected to ground in order to discharge the capacitor 38 through the resistor 42 according to an RC time constant. The first voltage 40 used to charge the capacitor 38 may be the same or different from the first voltage 40 applied to the FHA through the transistor 44. As the capacitor 38 discharges, the resistance of the transistor 44 increases to thereby decrease the voltage applied to the FHA exponentially as shown in FIG. 2A. In one embodiment, the switch 32 may connect the second voltage 34 to the FHA after a predetermined interval, wherein the second voltage 34 represents the steady state voltage applied to the FHA during the remainder of the write operation.

Prior to reaching the end of the write operation, switch 36 connects the first voltage 40 to the capacitor 38 through the resistor 42 to begin charging the capacitor 38. At the end of the write operation, the switch 32 connects the first voltage 40 to the FHA through the resistance of the transistor 44, thereby implementing the step function shown in FIG. 2A. As the capacitor 38 is further charged by the first voltage 40 according to the RC time constant, the voltage applied to the FHA through the transistor 44 increases exponentially as shown in FIG. 2A. In one embodiment, the circuitry shown in FIG. 3A may be duplicated using different resistor 42 and capacitor 38 values in order to implement different RC time constants for decreasing/increasing the FHA voltage.

In one embodiment, the RC time constants and first and second voltages 34 and 40 may be determined theoretically based on the characteristics of the laser, head, and FHA, or they may be determined empirically through experimentation. In either case, the RC time constants and first and second voltages 34 and 40 are selected so as to best match the transient response of the FHA to the laser's heating/cooling effect on the protrusion transient of the head.

Figure 3B:
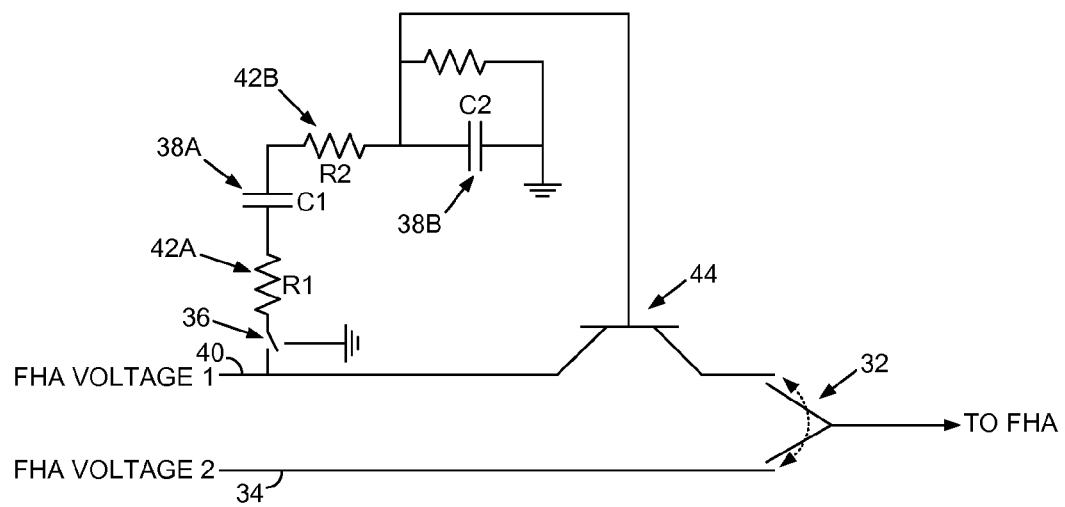
FIG. 3B shows control circuitry according to an embodiment of the present invention for decreasing/increasing the FHA power based on multiple exponentials.

FIG. 3B shows control circuitry according to an embodiment of the present invention for increasing/decreasing the FHA power based on a function comprising multiple exponentials. The multiple exponentials are implemented by charging/discharging a first resistor 42A and capacitor 38A comprising a first RC time constant, and by charging/discharging a second resistor 42B and capacitor 38B comprising a second RC time constant, and by controlling switches 32 and 36 as described above with reference to FIG. 3A.

In other embodiments, the functions for decreasing/increasing the FHA power may be implemented using a suitable state machine circuit or by a microprocessor executing a control program. In addition, any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions of a control program, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks defined by servo sectors, wherein each data track comprises a plurality of data sectors;
   a head actuated over the disk, wherein the head comprises a laser operable to heat the disk while writing data to the disk and a fly height actuator (FHA) operable to adjust a fly height of the head over the disk; and
   control circuitry operable to:
      receive a write command to write data to a target data track;
      position the head over the target data track;
      when the head approaches a target data sector of the target data track, increase a power applied to the FHA to decrease the fly height of the head; and
      when the head reaches the target data sector, increase a power applied to the laser to heat the disk, and decrease substantially monotonically the power applied to the FHA while writing data to the target data sector.

2. The disk drive as recited in claim 1, wherein the control circuitry is further operable to decrease substantially monotonically the power applied to the fly height actuator based on a function comprising at least one exponential.

3. The disk drive as recited in claim 1, wherein the control circuitry is further operable to decrease substantially monotonically the power applied to the FHA prior to the head reaching the target data sector.

4. The disk drive as recited in claim 1, wherein the control circuitry is further operable to:
   decrease the power applied to the laser after writing the data to the target data track; and
   after decreasing the power applied to the laser, increase substantially monotonically the power applied to the FHA.

5. The disk drive as recited in claim 4, wherein the control circuitry is further operable to increase substantially monotonically the power applied to the FHA based on a function comprising at least one exponential.

6. The disk drive as recited in claim 4, wherein after decreasing the power applied to the laser the control circuitry is operable to:
   increase the power applied to the FHA by a step increment; and
   after increasing the power applied to the FHA by the step increment, increase substantially monotonically the power applied to the FHA.

7. The disk drive as recited in claim 6, wherein the control circuitry is further operable to increase substantially monotonically the power applied to the FHA based on a function comprising at least one exponential.

8. A method of operating a disk drive, the disk drive comprising a head actuated over a disk comprising a plurality of data tracks defined by servo sectors, wherein each data track comprises a plurality of data sectors, and the head comprises a laser operable to heat the disk while writing data to the disk and a fly height actuator (FHA) operable to adjust a fly height of the head over the disk, the method comprising:
   receiving a write command to write data to a target data track;
   positioning the head over the target data track;
   when the head approaches a target data sector of the target data track, increasing a power applied to the FHA to decrease the fly height of the head; and
   when the head reaches the target data sector, increasing a power applied to the laser to heat the disk, and decreasing substantially monotonically the power applied to the FHA while writing data to the target data sector.

9. The method as recited in claim 8, further comprising decreasing substantially monotonically the power applied to the FHA based on a function comprising at least one exponential.

10. The method as recited in claim 8, further comprising decreasing substantially monotonically the power applied to the FHA prior to the head reaching the target data sector.

11. The method as recited in claim 8, further comprising:
    decreasing the power applied to the laser after writing the data to the target data track; and
    after decreasing the power applied to the laser, increasing substantially monotonically the power applied to the FHA.

12. The method as recited in claim 11, further comprising increasing substantially monotonically the power applied to the FHA based on a function comprising at least one exponential.

13. The method as recited in claim 11, wherein after decreasing the power applied to the laser further comprising:
    increasing the power applied to the FHA by a step increment; and
    after increasing the power applied to the FHA by the step increment, increasing substantially monotonically the power applied to the FHA.

14. The method as recited in claim 13, further comprising increasing substantially monotonically the power applied to the FHA based on a function comprising at least one exponential.

* * * * *